(12) United States Patent
Poulsen

(10) Patent No.: US 8,294,992 B2
(45) Date of Patent: Oct. 23, 2012

(54) PROJECTION-RECEIVING SURFACE

(75) Inventor: Peter Poulsen, Grants Pass, OR (US)

(73) Assignee: Merlin Technologies, Inc., Grants Pass, OR (US)

( * ) Notice: Subject to any disclaimer, the term of this patent is extended or adjusted under 35 U.S.C. 154(b) by 184 days.

(21) Appl. No.: 12/658,393

(22) Filed: Feb. 6, 2010

(65) Prior Publication Data

US 2011/0051252 A1    Mar. 3, 2011

Related U.S. Application Data

(63) Continuation-in-part of application No. 10/993,423, filed on Nov. 18, 2004, now Pat. No. 7,268,950.

(51) Int. Cl.
*G02B 27/10* (2006.01)
(52) U.S. Cl. .................... 359/624; 359/618
(58) Field of Classification Search .......... 359/624
See application file for complete search history.

(56) References Cited

U.S. PATENT DOCUMENTS

| | | | |
|---|---|---|---|
| 3,754,813 | A | 8/1973 | Depalma |
| 5,127,722 | A | 7/1992 | Nishitani |
| 5,513,037 | A | 4/1996 | Yoshida |
| 6,034,817 | A | 3/2000 | Mihalakis |
| 6,115,181 | A * | 9/2000 | Kelly ........................... 359/618 |
| 6,130,777 | A | 10/2000 | Yamashita |
| 6,424,463 | B1 | 7/2002 | Nishitani |
| 6,437,917 | B1 | 8/2002 | Ooshima |
| 6,574,041 | B1 | 6/2003 | Chen |
| 6,600,600 | B2 | 7/2003 | Chen |
| 7,054,068 | B2 | 5/2006 | Yoshida |
| 7,092,166 | B1 | 8/2006 | Wood |
| 7,349,154 | B2 | 3/2008 | Aiura |
| 7,408,709 | B2 | 8/2008 | Shimoda |
| 2002/0085287 | A1 * | 7/2002 | Egawa ......................... 359/619 |
| 2008/0043326 | A1 | 2/2008 | Poulsen |

FOREIGN PATENT DOCUMENTS

| | | |
|---|---|---|
| JP | 8-8168 | 1/1996 |
| JP | 10-20242 | 1/1998 |
| JP | 2002-49326 | 2/2002 |
| JP | 2002-90313 | 3/2002 |
| JP | 2002-122416 | 4/2002 |
| JP | 2002-350724 | 12/2002 |

* cited by examiner

*Primary Examiner* — James Jones
(74) *Attorney, Agent, or Firm* — Brandau & Associates, LLC

(57) ABSTRACT

This invention presents a projection-receiving surface that has a surface having an undulating contour. The undulating contour comprises a plurality of alternating convex cylindrical surface segments and concave cylindrical surface segments. The convex cylindrical surface segments and concave cylindrical surface segments of the undulating contour of the surface arranged with cylindrical axes in a direction. The surface can further have an additional surface feature comprising striations, cusps, and/or nanoflaked reflector leaves. The striations are arranged crosswise to the undulating contour. The surface can be a reflection surface of a front projection-receiving surface.

26 Claims, 16 Drawing Sheets

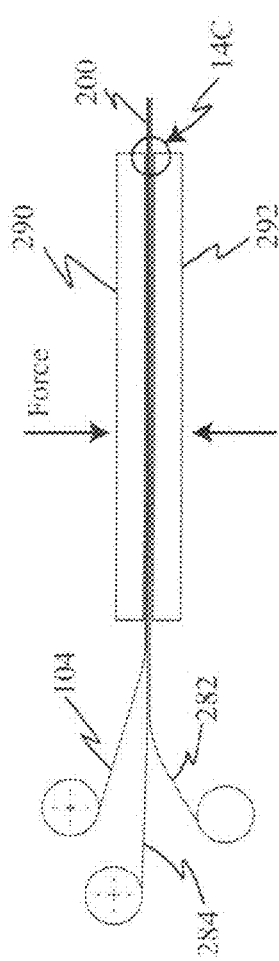
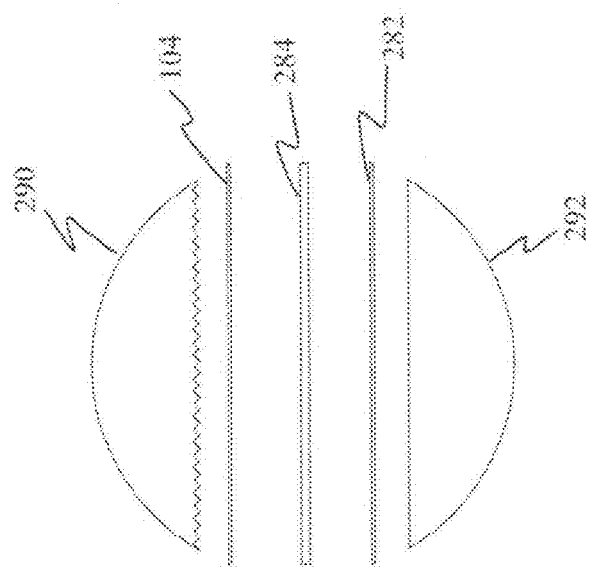
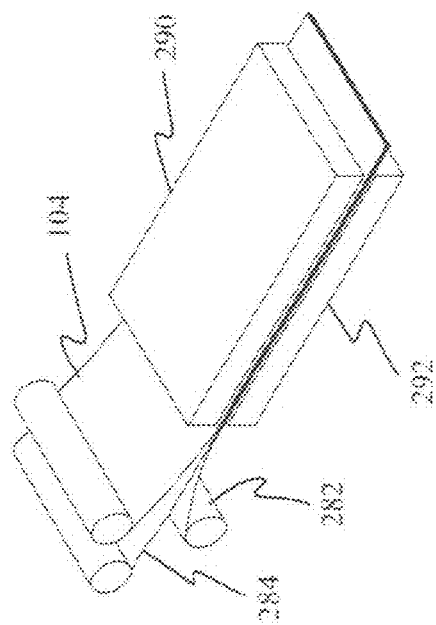

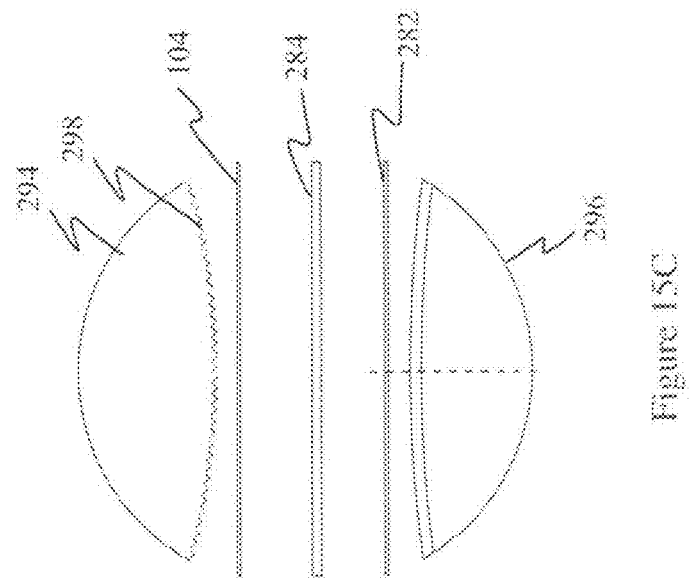
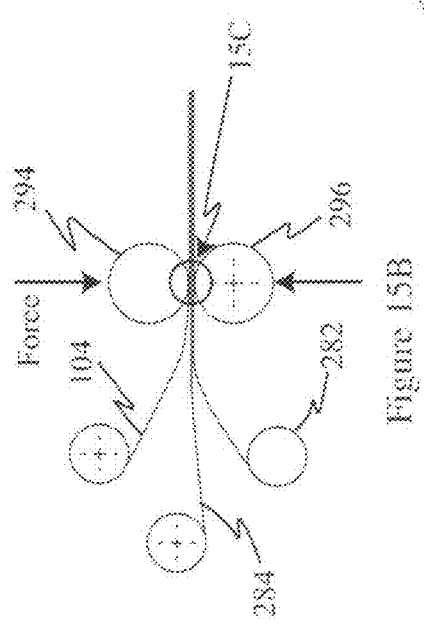
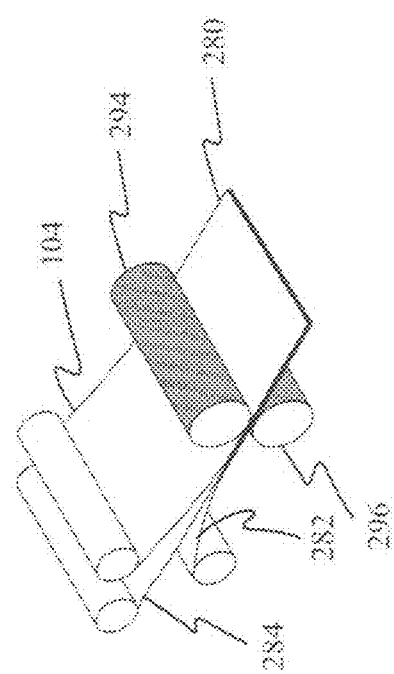

PROJECTION-RECEIVING SURFACE

CROSS-REFERENCE TO RELATED APPLICATIONS

This application is a continuation-in-part of U.S. application Ser. No. 10/993,423 titled "Variable Optical Arrays and Variable Manufacturing Methods" filed on Jul. 26, 2007, which is a continuation-in-part of U.S. application Ser. No. 10/993,423 titled "Variable Optical Arrays and Variable Manufacturing Methods" filed on Nov. 18, 2004, which claims the benefit of U.S. provisional application No. 60/523,076 titled "Optical Arrays That Can Be Easily Manufactured Over a Large Range of Sizes And Densities" filed on Nov. 18, 2003. The disclosures of the above applications are incorporated herein by reference in their entirety.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention relates generally to projection-receiving surfaces, and more particularly to a projection-receiving surface having crossed axial optic arrays.

2. Description of Related Art

Projection screens have been used for displaying a projected image for the view of an audience. Various screen constructions have been developed in effort to improve the quality of projected image.

Catadioptric screen system achieves enhanced gain using a refractive process and a reflective process. First, incoming projection light impinges on a refractive layer (lens array, optical beads, prisms, etc) that deviates the path of the light. The light then continues on to a reflective layer. The reflective layer reflects the light back out through the refractive layer, from which the light exits into a viewing volume (region wherein observers satisfactorily see the image light on the screen).

Refractive layers of catadioptric screens have lens arrays (pixels). Beaded screens are the most common in the marketplace. However, gains achievable with beaded screens are restricted by intrinsic limits of spheres in allowing active area packing density.

SUMMARY OF THE INVENTION

The present invention provides a projection-receiving surface that includes a first surface having an undulating contour and a second surface having an undulating contour. The undulating of the first surface contour comprises a plurality of alternating convex cylindrical surface segments and concave cylindrical surface segments. The convex cylindrical surface segments and concave cylindrical surface segments of the undulating contour of the first surface are arranged with cylindrical axes in a first direction. The undulating contour of the second surface comprises a plurality of alternating convex cylindrical surface segments and concave cylindrical surface segments. The convex cylindrical surface segments and concave cylindrical surface segments of the undulating contour of the second surface are arranged with cylindrical axes in a second direction. The first direction and second direction are skew with each other.

In a preferred embodiment, the first direction and second direction are perpendicular to each other. Preferably, the first direction is horizontal and the second direction is vertical.

In a preferred embodiment, the second surface is coated with a reflective material film so that the second surface serves as a reflection surface. In a preferred embodiment, the first surface is covered by a transparent protection film.

The projection-receiving surface can include an optical sheet made of transparent material having the first surface on one side and the second surface on the other side. In a preferred embodiment, the undulating contours of the first surface and second surface is formed by a process selected from the group comprising a machining, milling, pressing, stamping, etching, vacuum forming, electroforming, and rolling.

Alternatively, the projection-receiving surface can include a first optical sheet and a second optical sheet having the first surface and the second surface, respectively. The first optical sheet and the second optical sheet can be bonded to each other. Alternatively, the first optical sheet and the second optical sheet are distanced from each other. The first surface of the first optical sheet and the second surface of the second optical sheet can be formed by a process selected from the group comprising a machining, milling, pressing, stamping, etching, vacuum forming, electroforming, rolling, and extruding.

In a preferred embodiment, the second surface further has an additional surface feature. In a preferred embodiment, the additional surface feature includes striations comprising a plurality of alternating convex segments and concave segments formed in an undulating manner arranged in the first direction. Preferably, the spatial frequency of the striations is higher than the spatial frequency of the undulating contour of the second surface. In a preferred embodiment, the striations can have ten times the spatial frequency of the undulating contour of the second surface. Additionally or alternatively, the undulating amplitude of the striations is smaller than the undulating amplitude of the undulating contour of the second surface. In a preferred embodiment, the striations can have from one-thirtieth to one-twentieth the amplitude of the undulating contour of the second surface. In another preferred embodiment, the additional surface feature is at least partially non-curved. The additional surface feature can have convex and/or concave cusps. Additionally or alternatively, the additional surface feature can have nanoflaked reflector leaves.

Additionally or alternatively, the first surface can further have additional surface feature.

The present invention can also provide a projection-receiving surface that has a surface having an undulating contour. The undulating contour comprises a plurality of alternating convex cylindrical surface segments and concave cylindrical surface segments. The convex cylindrical surface segments and concave cylindrical surface segments of the undulating contour of the surface are arranged with cylindrical axes in a second direction. The first direction and second direction are skew with each other. Preferably, the surface further comprises an additional surface feature comprising striations, cusps, and/or nanoflaked reflector leaves.

The present invention can be described in light of the novel feature of plurality of pixels. The pixels comprise not only convex-convex pixels and concave-concave pixels, but also convex-concave pixels and concave-convex pixels. Each of the convex-convex pixels is formed by a convex first surface and a concave second surface. Each of the convex-concave pixels is formed by a convex first surface and a concave second surface. Each of the concave-convex pixels is formed by a concave first surface and a convex second surface. Each of the concave-concave surface is formed by a concave first surface and a concave second surface.

The present invention can also provide a projection-receiving surface that has a first surface having an axial array and a second surface having an axial array. The axial arrays comprise a plurality of cylindrical surface segments arranged with cylindrical axes in crossed directions. The second surface further comprises an additional surface feature comprising striations, cusps, and/or nanoflaked reflector leaves. The axial arrays need not have undulating contour.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The above and other objects and features of the present invention will become apparent from the following description of preferred embodiments given in conjunction with the accompanying drawings, in which:

FIG. 14A is a perspective view of a system for a press-forming process; FIG. 14B is a side view of the system of FIG. 14A; FIG. 14C is an enlarged assembly view of the system taken of area 14C of FIG. 14B.

FIG. 15A is a perspective view of a system for a roll-forming process; FIG. 15B is a side view of the system of FIG. 15A; FIG. 15C is an enlarged assembly view of the system taken of area 15C of FIG. 15B.

DETAILED DESCRIPTION OF THE INVENTION

Figure 1:
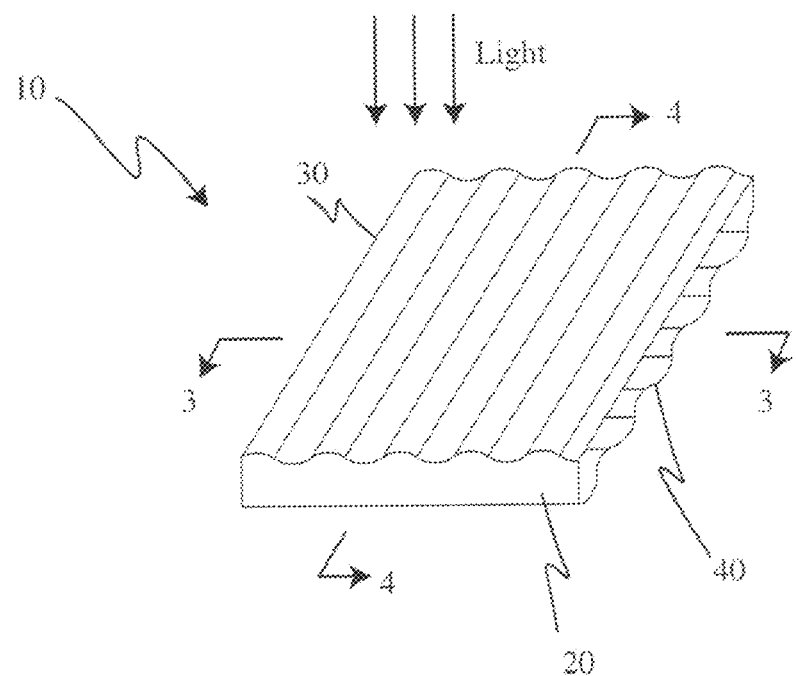
FIG. 1 is a top perspective view of a projection-receiving surface according to a preferred embodiment of the present invention.
Figure 2:
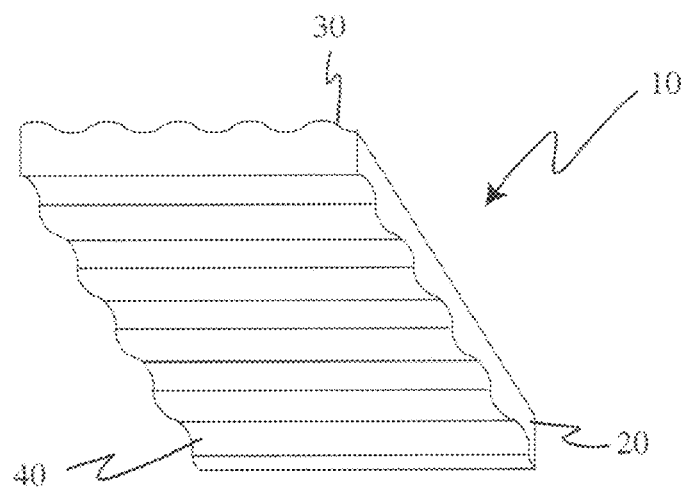
FIG. 2 is a bottom perspective view of the projection-receiving surface of FIG. 1.

Shown in FIGS. 1, 2, 3 and 4 is a projection-receiving surface 10 according to an embodiment of the present invention. The projection-receiving surface 10 has an optical sheet 20 having a front surface 30 and a rear surface 40 on opposite sides. The front surface 30 has an undulating contour consisting of a plurality of alternating convex cylindrical surface segments 31 and concave cylindrical surface segments 32. The convex/concave cylindrical surface segments 31, 32 are axially parallel and arranged collectively edge against edge. The rear surface 40 also has an undulating contour consisting of a plurality of alternating convex cylindrical surface segments 41 and concave cylindrical surface segments 42. The convex/concave cylindrical surface segments 41, 42 are axially parallel and arranged collectively edge against edge. The visual appearance of the undulating contours on each side of the optical sheet 20 is somewhat like corrugation as shown in FIG. 1.

Figure 3:
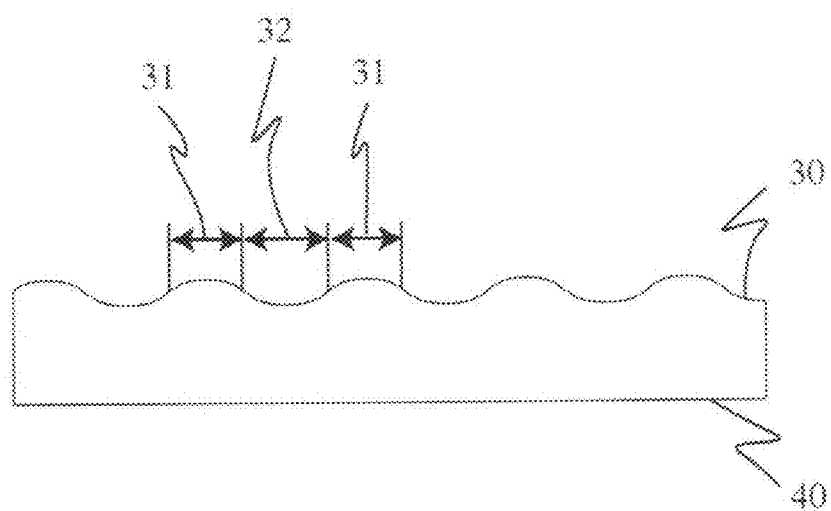
FIG. 3 is a cross-sectional view of the projection-receiving surface of FIG. 1 taken from Line 3-3.
Figure 4:
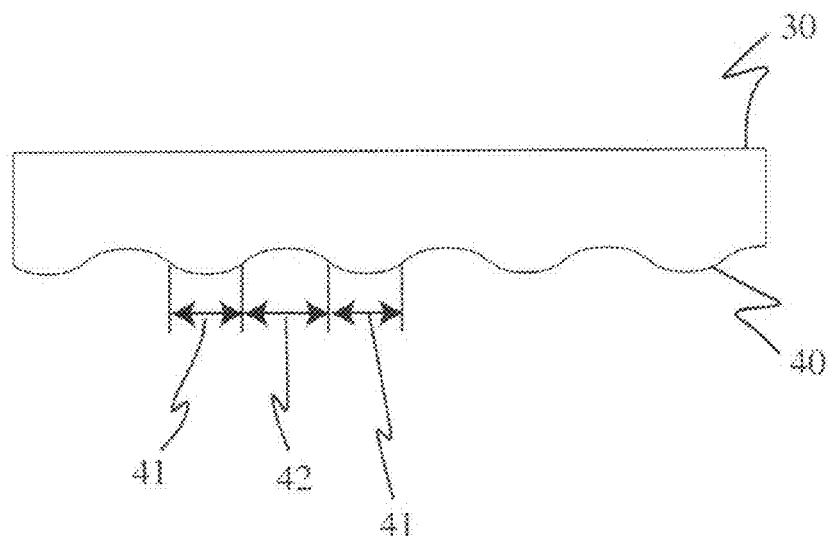
FIG. 4 is a cross-sectional view of the projection-receiving surface of FIG. 1 taken from Line 4-4.

The undulating contour of the front surface 30 as shown in FIG. 3 is defined, either exactly or approximately, by application of the equation:

$$y = \sqrt{[(qn-1)P/\tan\phi)]^2 - (x-1)^2 J} - \{P/2\tan(\phi)\}$$

where n is the index of refraction for the substrate
q is a surface interaction coefficient
P is the dimension across the pixel
φ is one half of the full field angle
x and y are coordinates defining the curve
l is an offset parameter=mP/2, with m=1,3,5, ... M The undulating contour of the rear surface 40 as shown in FIG. 4 is defined, either exactly or approximately, by application of the equation:

$$y = \sqrt{[P/2\sin\theta)^2 - (x-k)^2]} - [P/2\tan(\theta)]$$

where P is the dimension across the pixel
θ is one quarter of the full field angle
x and y are coordinates defining the curve
k is an offset parameter mP/2, with m=1,3,5, ... M In applications where the projection-receiving surface 10 is used as a front projection-receiving surface, the front surface 30 of the optical sheet 20 serves as a refraction surface consisting of cylindrical lenses having alternating negative and positive focal lines (loci of focal points). The rear surface 40 is coated with reflector layer 45, and serves as a reflection surface having alternating positive and negative focal lines. Light enters through the front surface 30 that refracts the light, and reaches the rear surface 40 that reflects the light back out through the front surface 30 that refracts the light again.

In applications where the projection-receiving surface 10 is used as a rear projection-receiving surface, both the front surface 30 and the rear surface 40 serve as refraction surfaces.

The cylindrical axes of the undulating contours of the front surface 30 and the rear surface 40 are aligned crosswise to each other to produce both vertical and horizontal dispersion of light projected onto the projection-receiving surface 10. In a preferred embodiment, the cylindrical axis of the undulating contour of the front surface 30 is horizontal and the cylindrical axis of the undulating contour of the rear surface 40 is vertical. In this embodiment, the front surface 30 serving as a refraction surface would produce a vertical dispersion of projected light and the rear surface 40 serving as a reflection surface would produce a horizontal dispersion of projected light. Vice versa is also possible.

Figure 5:
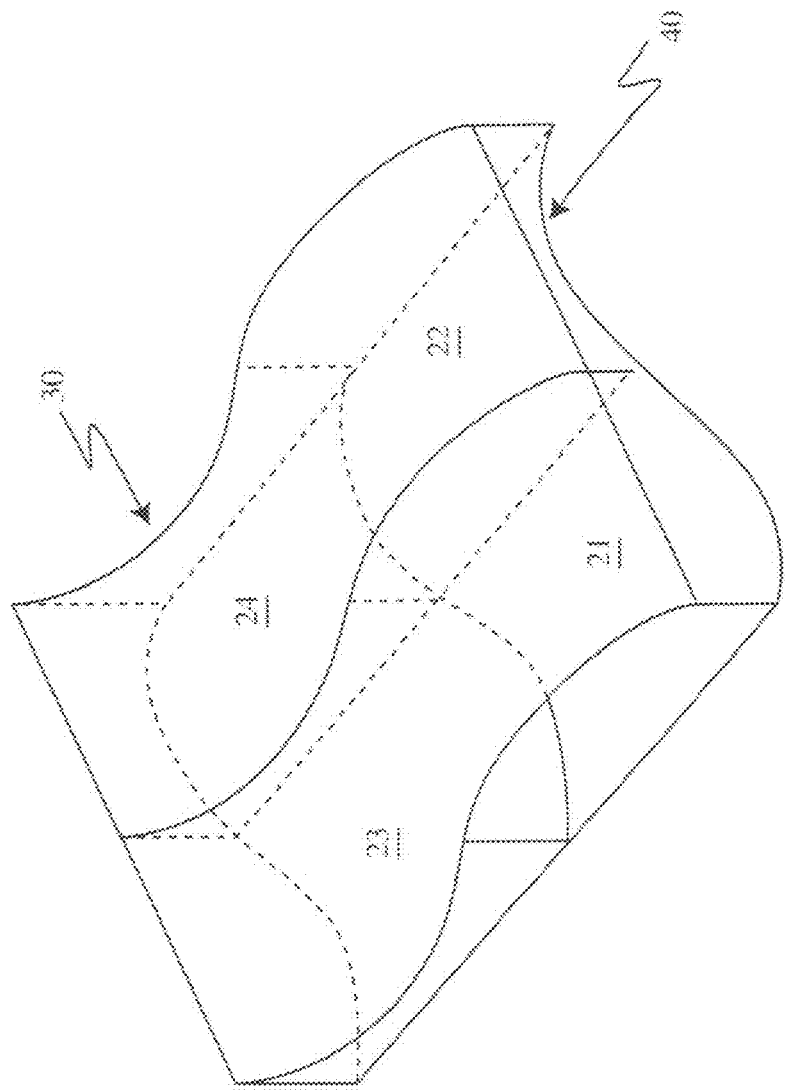
FIG. 5 is a partial, enlarged view of the projection-receiving surface of FIG. 1.

The pixel dimensions are defined by the points of inflection on the undulation curve. FIG. 5 shows four pixels formed by crossing one full cycle of the front surface 30 with one full cycle of the rear surface 40. In other words, the projection-receiving surface 10 has convex-convex pixels 21, convex-concave pixels 22, concave-convex pixels 23, and concave-concave pixels 24. Due to the undulating contour of the front surface 30, the light passing through the front surface 30 is refracted at the front surface 30 and reflects off of the rear surface 40 and returns back out through the front surface 30. Because the rear surface (reflection surface) 40 is also curved in the cross plane, the light trace is very complex except for the condition wherein the light strikes the rear surface 40 in the plane normal to its surface.

In addition, because there are no barriers between cells the light can cross-talk between cells. The further the front surface 30 and the rear surface 40 are from one another, the more the cross-talk that can bleed across (slip under).

The undulating contours of the front surface 30 and the rear surface 40 are advantageous when making high gain, rapid angular cut-off front projection-receiving surfaces. They are particularly advantageous for screens having pixel sizes as small as 0.3 mm (and even less). The advantage of the smooth undulation when compared with draped-film contours is in that the ledge turnaround in draped-film contours is non-existent in the smooth undulation. With draped film, the turnaround effects can become a large scattering contributor at small pixel sizes, and thus the ability to closely control the cut-off angles can be lost. In addition, there is no need for the film to stretch, and the undulating architecture is more amenable to large scale production such as can be achieved by roll-to-roll forming processes as further described below. One added challenge to the undulating contour approach can be that the surface finish of the production tooling may need to be better than for the draped film production process.

Figure 6A:
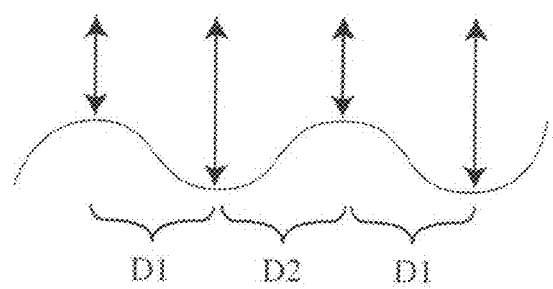
FIGS. 6A, 6B and 6C show "walking together" effect of an undulating reflective surface.
Figure 6B:
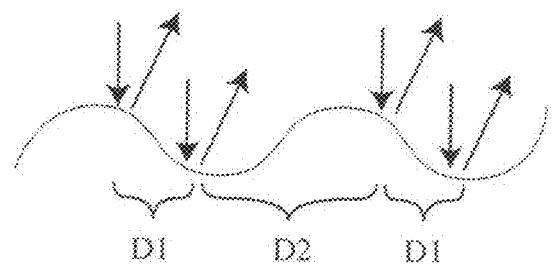
Figure 6C:
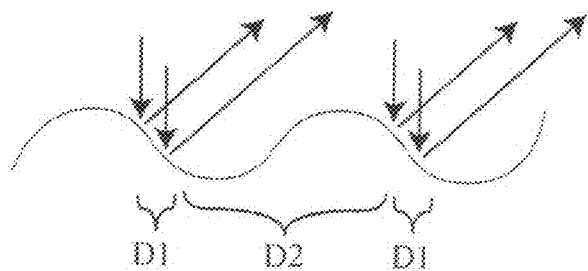

Another characteristic of a reflection surface with undulating contour can be a "walking together" effect of the reflected light as the viewer moves away from face-on observation. FIG. 6 illustrates that as the glint spot on the pixel formed by the convex cylindrical surface segment 41 of the rear surface (reflection surface) 40 moves in one direction when the viewer changes observation angle, the glint spot on the concave cylindrical surface segment 42 moves in the opposite direction. Accordingly, if the projection-receiving surface 10 is to be viewed significantly off axis, the image glint reflected from the convex cylindrical surface segment 41 and the image glint from the concave cylindrical surface segment 42 touch at one point, leaving a two-pixel-width gap between that point and the next point where two glints likewise touch. To maintain the reflective element spatial frequency must be increased according to the desired off-axis resolution. It might seem that to maintain the on-axis resolution, the spatial frequency of the undulations must be increased by exactly or approximately a factor of two. However, it should be remembered that off-axis the angular extent of each pixel as seen by the viewer decreases. Therefore, the spatial frequency can be increased by only $1/\cos(\theta)$ with acceptable results in many cases as long as $1/\cos(\theta)$ remains less than two.

Figure 7:
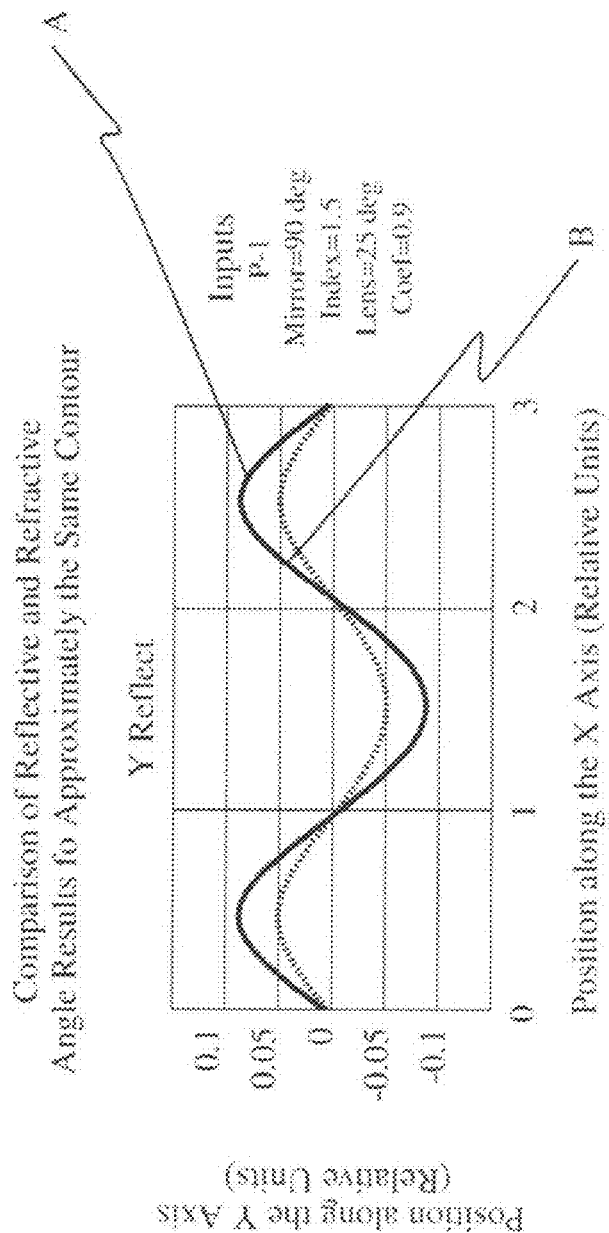
FIG. 7 is a plot showing the undulating contours of the refractive surface and the reflective surface of the projection-receiving surface of FIG. 1.

FIG. 7 shows plots of the contours needed for the refractive curve A and reflective curve B to create certain angular dispersion. The shown refractive curve A has greater undulation amplitude than that of the reflective curve B. Nonetheless, the reflective curve B provides a full deflection angle of 90 degrees while the refractive curve A provides a full deflection angle of only 25 degrees for a substrate with a refractive index of 1.5. That is, the dispersion of light due to the reflection can be quite large, but the dispersion due to refraction is considerably more limited. This is because refraction at any point on a refraction surface produces much less deviation of light than is produced by the equivalent point on a reflection surface.

If the undulation amplitude of the refraction surface is increased, there will be an associated degree of increased refractive deflection. However, the undulation amplitude of the refraction surface should be restricted because reflection off the refraction surface begins to increase significantly at the higher slope angles that are present at the sides of undulations of greater amplitude. This has three effects: 1) unacceptably decreasing the throughput of light into the substrate and thence onto the reflection surface, 2) unacceptably increasing pixel crosstalk (thereby causing the projection-receiving surface to lose both resolution and contrast), and 3) unacceptably increasing the distractive retro-reflection line that is produced by undiffused front surface reflection. Accordingly, increasing refractive deflection for a larger viewing range cannot be achieved by optical-quality surface finish and the contour figure of the refraction surface without limitation. In cases where a front projection-receiving surface has an undulating contour in a front refraction surface oriented with the cylindrical axes horizontal, the limitation on refractively producing a larger vertical dispersion angle could need to be overcome particularly when rapid angular cut-off profiles are desired for the purpose of rejecting background light and for achieving spatial gain.

In a preferred embodiment, the present invention uses additional surface contouring 50, including sub-pixel contouring such as striations and/or nanoflaked reflector leaves to increase viewing filed of the projection-receiving surface although the principle control of viewing angle is dominated by a sequence of refractions and reflections produced by the undulating contours described above. In other words, the undulating contour of the rear surface 40 having simple convex/concave cylindrical surface segments 41, 42 is modified. In general, some form of vertical dispersion is added to the otherwise non-vertical dispersive nature of the rear surface 40 with cylindrical axes vertical because vertical deflection due to refractive dispersion at the front surface 30 with cylindrical axes horizontal is not sufficient and because adding reflective material over the front surface 30 (partial coverage and/or partial transparency over the complete surface) can produce an unacceptable glare-line.

Figure 8:
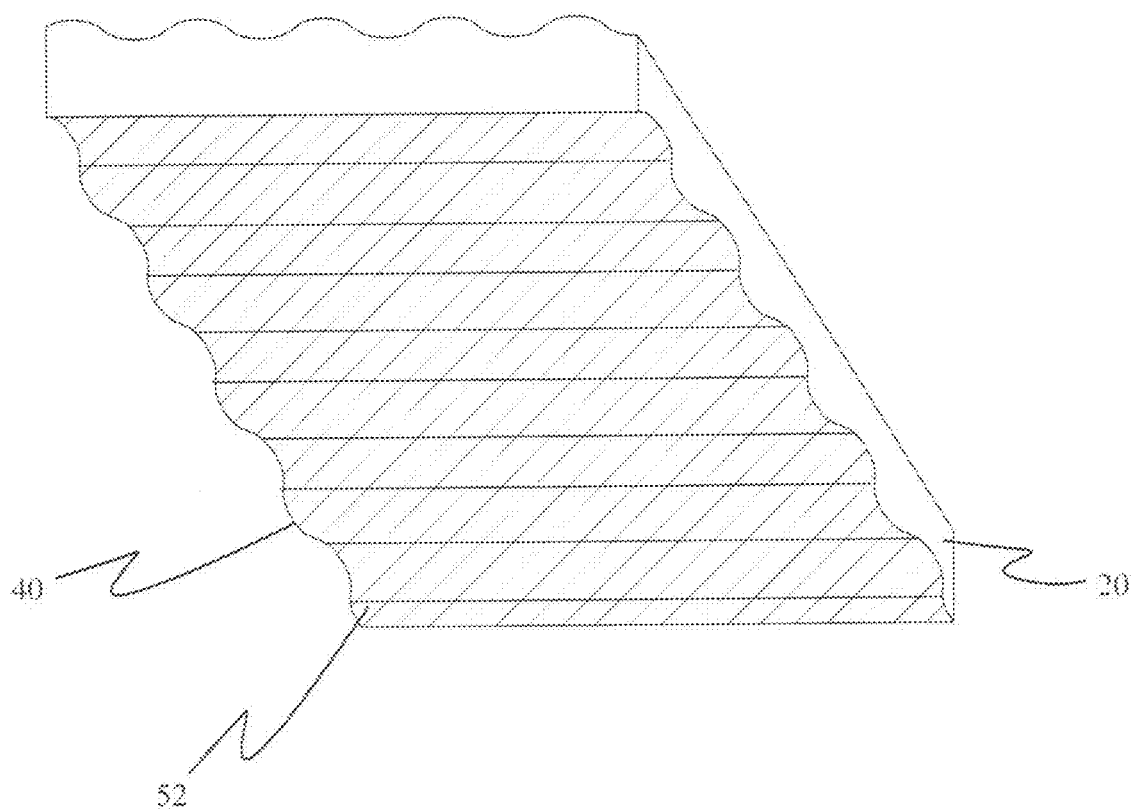
FIG. 8 is a bottom perspective view of a projection-receiving surface according to a further preferred embodiment of the present invention.
Figure 9:
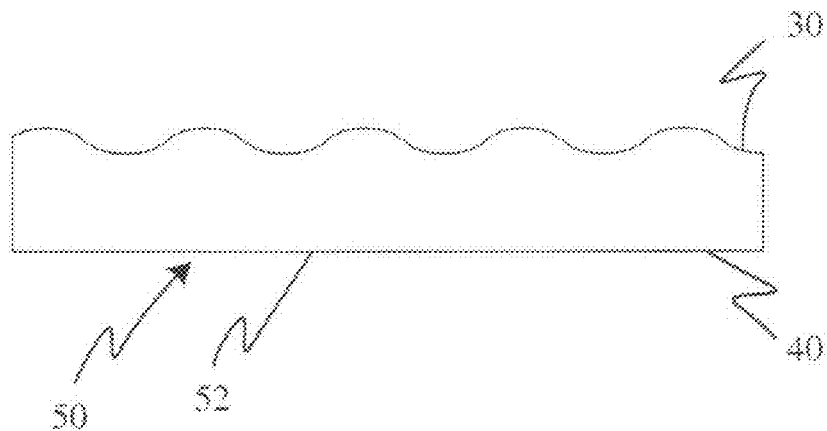
FIG. 9 is a cross-sectional view of the projection-receiving surface of FIG. 8.

FIGS. 8 and 9 show an embodiment where additional undulations 52 are added to the rear surface 40 of the projection-receiving surface 10. Preferably, the additional undulations 52 are striations formed in the rear surface 40 crosswise to the primary undulations consisting of the alternating convex/concave cylindrical surface segments 41, 42. In cases where the front surface 30 has cylindrical axes horizontal and the rear surface 40 has cylindrical axes vertical, the striations 52 are oriented horizontally riding on the primary undulating contour of the rear surface 40 in a manner that supplements the vertical refractive deflection provided by the front surface 30.

Preferably, the smaller undulating contour of the striations 52 can be obtained using the same equation of the primary undulating contour of the rear surface 40 as given above, with higher spatial frequency than pixel rate. The high spatial frequency helps avoid a sparkling effect as the reflective glint moves across the pixel. For example, with ten times the spatial frequency and one-thirtieth the amplitude, the striations 52 will increase the vertical deflection from the refractively produced 25 degrees to a total of 35 degrees (increase by 10 degrees). With ten times the spatial frequency and one-twentieth the amplitude, the striations 52 will increase the vertical deflection from the refractively produced 25 degrees to a total of 45 degrees (increase by 20 degrees). Although more vertical deflection is possible using the striations 52, there can be practical limitation to the desirability of continued increase if rejection of overhead lighting and achievement of optical gain are desired. Both of these desires are thwarted if the vertical deflection angle of a front projection-receiving surface gets too large, even though such increase is technically possible using the striations 52.

Besides improving the manufacturability of the projection-receiving surface 10 with higher spatial resolution, the projection-receiving surface 10 with the high spatial frequency undulation design will use a thinner optical sheet 20 separating the front surface (refraction surface) 30 from the rear surface (reflection surface) 40. That is because at high spatial resolution the projection-receiving surface 10 will typically need to be made thinner to prevent pixel crosstalk. Accordingly, the projection-receiving surface 10 with higher resolution also provides reduction in scattering and haze effects due to the optical sheet 20. Yet, the ability to achieve off-axis light rejection (for contrast enhancement) by the use of absorption material such as a dye need not be diminished because one can simply increase the absorption coefficient of the dye according to the thickness.

Although higher spatial frequency design has advantages of reducing the likelihood of speckle-based brightness fluctuation and reducing the amount of unidirectional stretching of the film per pixel dimensions if a film is used, the additional undulations 52 can also be at a lower spatial frequency than the pixel rate, or at the same spatial frequency of the pixel rate.

Figure 10:
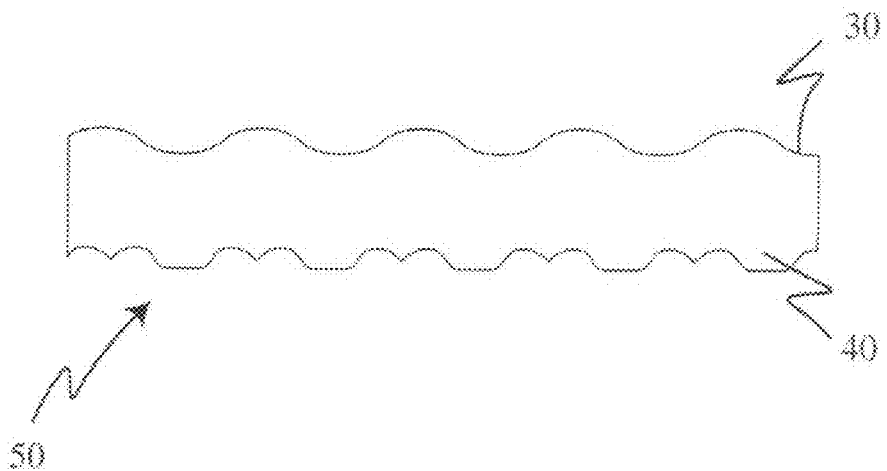
FIG. 10 is a cross-sectional view of a projection-receiving surface according to another further preferred embodiment of the present invention.

In addition, the additional surface contouring 50 to the rear surface 40 need not be continuously undulating. The additional surface contouring 50 can be intermittent with regular spacing or it can be intermittent with irregular spacing. The additional surface contouring 50 can also be non-curved, as shown in FIG. 10 where flat surfaces are used to reflect a portion of the light in a manner to increase the vertical deflection at which it will emerge from the front surface 30. By keeping the flat near the pixel edge of the front surface (refraction surface) 30, the exiting light will strike the front surface (refraction surface) 30 more closely to normal, thereby improving the transmission.

Moreover, the additional surface contouring 50 can include other sub-pixel additions such as cusps, either convex, concave or some combination of both.

The additional surface contouring 50 can also be accomplished by the use of a specular nanoflake reflector coating. Normally, aluminized coatings are deposited onto the rear surface 40, or provided by an adherent reflective film, to take full advantage of the specularity of the optically finished and carefully figured reflective side of a crossed cylinder high-gain screen. However, using a coating of aluminum (or other reflective material) nanoflakes can produce an augmenting dispersion beyond that governed by the carefully figured surface contour. The tilt of the planar nanoflakes can lay upon each other.

Use of nanoflakes generally will increase light dispersion equally in all directions. Therefore, the horizontal dispersion angle will also be increased. This can in part be compensated by reducing the undulation amplitude of the rear surface (reflective surface) 40. The increased angles associated with nanoflake surface covering are typically accompanied by loss of the sharp cut-off profiles associated with high-gain screens that take full advantage of the figure and finish of the surfaces.

It should also be noted that striations 52 and nanoflakes are useful for the front surface (refraction surface) 30 as well as for the rear (reflection surface) 40. The distractive retro-reflection line associated with the front surface 30 can be diffused using striations 52. Clear polymer nanoflakes can be distributed onto the front surface 30.

All of the additional surface contour 50 including sub-pixel contours such as striations 52 or nanoflakes are also applicable to screens other than those described by the earlier provided equations. In other word, the additional surface contouring 50 can be added to projection-receiving surfaces with surface contours other than undulating contours.

The refraction on the incoming light at the front surface 30 is the same whether the interface between the air and the optical sheet 20 is exterior to the projection-receiving surface 10 assembly or interior to the projection-receiving surface 10 assembly. That is, functionally there will be little difference optically if the projection-receiving surface has an air gap between the refractive and the reflective components. The air gap can be used with the undulations internal or external to the assembly. Another option is to provide undulations on both sides of the optical sheet 20, with an air gap (or other material of refractive index differing from the optical sheet 20 material) falling between the refractor array and the reflector array. Incorporation of an air gap of material of differing refractive index complicates the mechanics of establishing and maintaining structural tolerances.

Protection film may be coated onto the front surface 30 or the rear surface 40 or both. The protection film on the front surface 30 should be transparent.

The projection-receiving surface 10 or the optical sheet 20 according to the present invention can be obtained via various kinds of processes. First, the undulating contours of the front surface 30 and the rear surface 40 can be formed on both sides of a one-piece sheet as illustrated. However, the optical sheet 20 having the front surface 30 and the rear surface 40 can consist of two or more axial, optical arrays each having an undulating contour. The two or more axial, optical arrays can be obtained by machining, rolling or by molding. The two or more axial, optical arrays can be bonded to one another or can be arranged with a gap therebetween without any bonding or attaching.

Additionally or alternatively, the undulating contour consisting of the plurality of convex/concave cylindrical surface segments 31, 32; 41, 42 can be manufactured integrally during a single process, or can be manufactured separately and then attached or bonded to one another edge against edge.

In cases where the optical sheet 20 is obtained by attaching or bonding separate convex/concave cylindrical surface segments 31, 32; 41, 42 or by two or more axial, optical arrays, the separate segments 31, 32, 41, 42 and/or axial, optical arrays may be obtained by machining, milling, pressing, stamping, etching, vacuum forming, electroforming, rolling, molding, injection, casting, deposition, precipitation, photo-processes, broaching, photo-processes.

First, axial optical arrays or segments may be obtained by machining. Specifically, in a milling operation a piece of optic-compatible material can be mounted onto a milling bed and fed into a cutting tool (such as a ball mill or other cutting shapes) along a continuous axis to obtain a continuous cut that is linear when examined from at least one viewing perspective. The milling bed can then be offset to produce a cut that is also linear when observed with the same aforementioned perspective, and is nearly parallel to the first.

Another mechanical way to obtain axial, optical arrays is the extrusion process. An axial, optical array or segment can be made via extrusion, whereas a spherical optic cannot be made via extrusion. The extrusion mold can be machined longitudinally, and then polished.

Broadly speaking, many techniques are suited to production of the axial, optical arrays. Included among these is fabrication of tooling to be used in replication of the appropriately surfaced pieces of material. Milling, broaching, casting, pressing, stamping, etching, vacuum forming, electroforming, and extruding are a few of the available techniques for making tooling. These tools can be used to fabricate the separate pieces via material addition to cavities (injection, casting, deposition, precipitation, photo-processes, extrusion, etc.), via material extraction (milling, broaching, etching, photo-processes, etc.), and via material displacement (rolling, flat pressing, stamping, melting to form, etc.).

An extremely valuable feature of the invention is that it allows cost effective manufacture of two-dimensional lens arrays, and facilitates manufacture of lens arrays of a spatial density that would be impractical, if not impossible, using prior optical manufacturing methods. Also, in several embodiments of this invention, the optical characteristics can be readily changed even after fabrication.

Applications of the optical sheet 20 include, but are not limited to, the following optical examples: Optical computing, communication, and coding; rear-screen and front-screen projection for theaters, home entertainment and schools; advertisement signage and scoreboards; "eyeglasses" for military heads-up displays and for virtual reality systems to display a different three-dimensional image for each eye by collimating selected pixels; along with others. As previously indicated this invention is not limited to optical applications. This invention is also applicable to other regions of the electromagnetic spectrum, as well as to acoustic and other mechanical energies.

An entirely different way of producing an optic is using suspended film. Then, additional practical applications employing this new suspended film optic are discussed.

Figure 11:
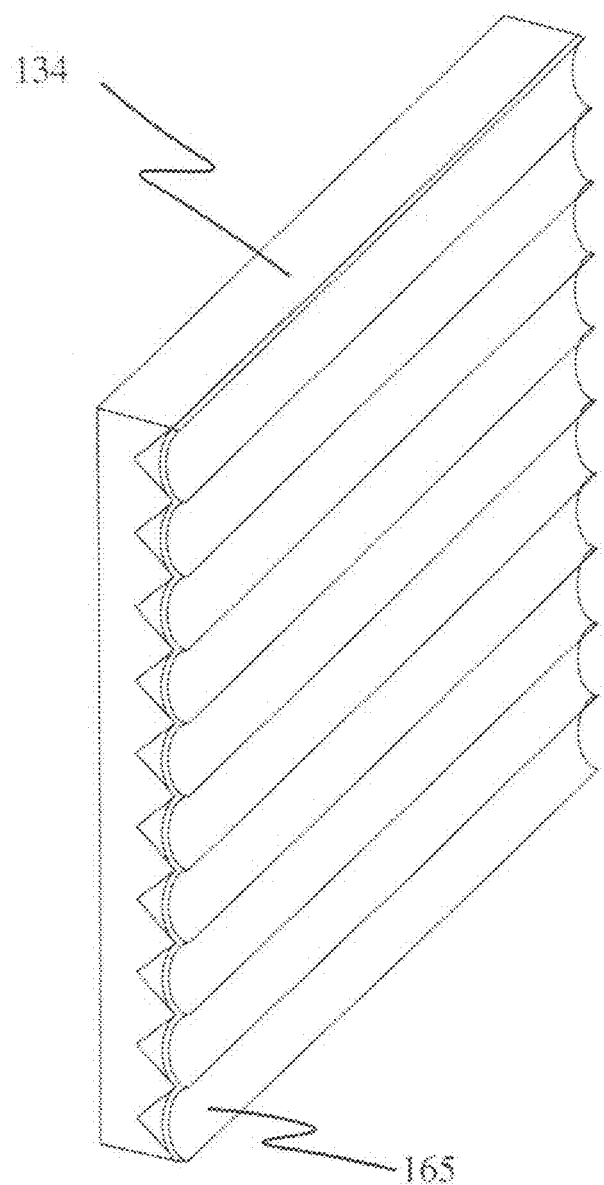
FIG. 11 is a perspective view of a film suspended on a tool.

In FIG. 11, a tool 134 is created by making a series of longitudinal cuts to create thin walls spaced at a distance of preferably 1 mm. Tool 134 is shown with v-shaped longitudinal cuts, but can also have u-shaped longitudinal cuts or square cuts. Holes (not shown) or even grooves, may be placed along the bottom of the cuts to provide communication for a differential pressure V. A sheet of film, transparent or reflective, is placed over the walls. Then, differential pressure V is applied via the holes (not shown) between the walls to pull the film, and a curved segment is formed. It is very important to understand that there is no further polishing of the optic that is required in order to have an optical quality surface. Then, a polymer may be poured behind the segment and cured, and thus a permanent segment of a axial, optical array is created, having a light focusing ability. A preferred polymer material may be obtained from Applied Poleramics, Incorporated, of Benicia, Calif. Preferred specific materials from Applied Poleramics are 266 epoxy and AU16 polyurethane, as well as EFM 15 and EFM 18 phenolics. In addition, the outside of the segment may be coated for protection of the optic surface, such as, for example, a thin acrylic coating, a urethane coating, or a polyethylene coating to prevent oxidation, abrasion or other surface degradation. Such coatings may be purchased from Peabody Laboratories, Inc. located at 1901 S. 54.sup.th Street, Philadelphia, Pa. 19143, and sold under the trade name PERMALAC. The differential pressure may be varied to vary the curvature of the segments of the axial, optical array.

Alternatively, a transparent tool 100 may be used with film. Here, the curved segment is continuously variable in curvature depending upon varying level of differential pressure. When a projected image is focused through the curved segment, the curvature of the segment may be changed by changing the level of differential pressure V, thereby yielding a variation in the focus of the image. This has very useful applications when the changing focus is coordinated with either a changing image or a changing viewer location.

In any preferred embodiment, any film may be used such as acetate, polyethylene, polypropylene, polycarbonate, or acrylic where the thickness is preferably between 0.25 mils and 1 mil.

Figure 12:
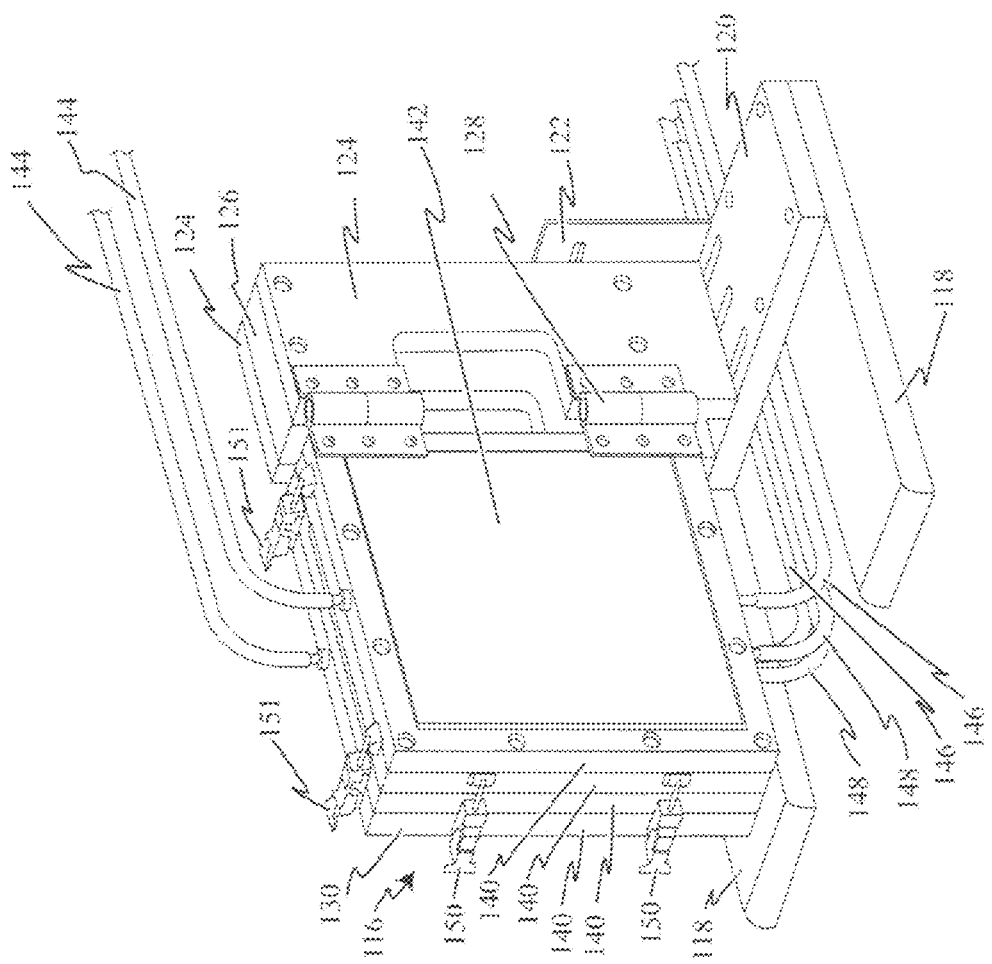
FIG. 12 is a perspective view of a mold with external attachments.
Figure 13:
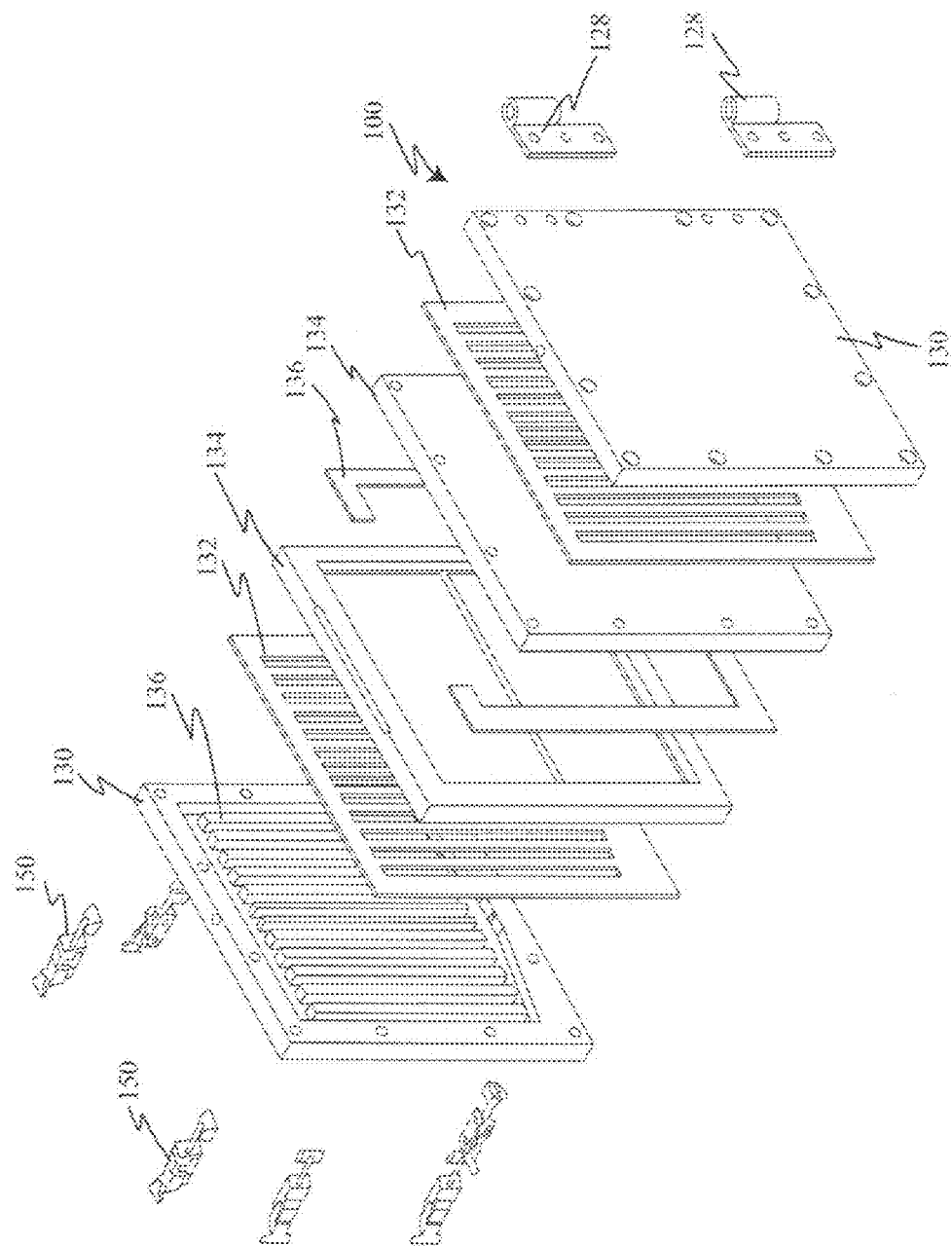
FIG. 13 is a perspective assembly view of the mold of FIG. 12.

When two tools 100 are employed simultaneously, facing each other in a crossed relationship, then it is easily seen that a crossed optical array can be created. Then, the space between the films may be filled with a plastic (the term "plastic" is intended to be used generically in its broadest sense and not meant to be limited to "polymer"). One preferred plastic is the epoxy referred to above, which because of its low viscosity, pours like water between the films where it is then heated and cured. This approach is used in reference to FIGS. 12 and 13. In FIGS. 12 and 13, a mold is shown generally at 116. The mold 116 has as supporting structure leg supports 118, base support 120, stabilization plate 122, upright supports 124, and spacing block 126. Hinges 128 permit easy access to the inner cavity by permitting laterally swinging and removable hinged doors 130. These doors 130 allow production personnel access to all necessary components concerning pre and post curing operations which may include secondary trimming. As better seen in FIG. 13, the mold 116 has doors 130, radiator 131, radiator gasket 132, vacuum bed 134, and spacing gasket 136. The tool 100 is placed within vacuum bed 134, on each side. As better seen in FIG. 12, a temperature sensor array 140 is provided on the exterior of the mold 116, as are external heating sources 142 (fixed onto doors 130 using a high temperature adhesive backing), high temperature fluid inlet hoses 144, high temperature fluid outlet hoses 146, and vacuum hoses 148. In use, film is placed on each of two tools 100 on each side of vacuum bed 134. Doors 130 are swung shut, and the assembly is latched 150. Differential pressure is asserted through vacuum hoses 140 to pull and suspend film 104 into a curved axial optic shape. Both films are pulled away from each other. It should be noted that pressure may be asserted instead of vacuum through vacuum hoses 140. Then, after the plastic, preferably epoxy, is poured and cured, a final curved axial optic solid is the result, curved at the outside and sharing a common center. Material sheets (pieces) can be flexible or rigid to varying degrees as appropriate to an application. The sheets can be combined with the use of gravity, adhesives, solvents, vacuum, fusion, pressure, mechanical devices, and other options. Edges of the stacked combinations can be left open or sealed. (Sealing allows for cleanliness and fluid containment; with the fluids being either gas or liquid or a combination of both.) The resultant array assemblies can be comprised of two or more axially-produced optical layers, with each layer being the same or different in figure, finish, material, or other characteristic suited to the application. It is possible to remove film after the liquid filler (epoxy) cures. Removing film removes a refractive index change at the interface between the film and the filler.

In previous discussion the screen formation process has been described in terms of using fluids to produce outward pressure against the film such that the film forms catenary curvature as it is held across linearly tooled ridges. In addition to production of the pressure by fluids, either gas or liquid, the invention allows for fabrication of a hybrid reflection screen structure 280 by creation of outward pressure between two films 104, 282, using a more solidified inner material 284 at the production onset. The term "hybrid screen" is used in reference to a situation where a first array of optics are joined to a second array of optics, and this application expressly teaches three ways to achieve this: vacuum/molding (FIGS. 12-13), press-forming (FIGS. 14A-14C), and roll-forming (FIGS. 15A-15C).

As seen in FIGS. 14A, 14B, and 14C, a sheet of optically appropriate deformable material 284 is placed between the two films 104, 282, typically with one being reflective and the other being transmissive; although both films 104, 282 could be transmissive if one desires the formation of a matrix of lenses. Films 104, 282 may be made from polyethelene (PET). Deformable material 284 may be made from urethane. The arrangement, with the deformable material 284 positioned between the two films 104, 282 is placed between a first tool 290 and a second tool 292. First tool 290 has linear ridging 298. Then, the following are stacked sequentially: press (represented by "FORCE" on top of first tool 290, first tool 290, film 104, deformable filler material 284, film 282, second tool 292, and press (represented by "FORCE" on the bottom of second tool 292). The tools 290, 292 are subjected to pressure from each outside face of the stack, which forces the film 104 against the tooled ridges 298 to deform the film 104 between the ridges 298 into the form of catenary-like cross-sectioned cylinders 280. Preferably, the pressure will be applied to the tools 290, 292 using a heated press. When a heated press is used, deformable material 284 may be more easily deformed if the deformable material 284 is selected to be thermally deformable. When the product is allowed to cool, the result is a fixed-shape hybrid screen 280. As stated above, the term "hybrid" is used in this document to refer to any screen that is provided with a first axial optical array in electromagnetic communication with a second axial optical array, and these arrays may be integrally joined as shown in FIGS. 12-13, 14A-14C, and 15A-15C. The use of a heated press can also be used to activate and cure chemical processes in thermal-setting materials 284, which is a variant of the aforementioned simple elevated temperature thermal deformation process.

As seen in FIGS. 15A, 15B, and 15C, a sheet of optically appropriate deformable material 284 is placed between the two films 104, 282, typically with one being reflective and the other being transmissive; although both films 104, 282 could be transmissive if one desires the formation of a matrix of lenses. The arrangement, with the deformable material 284 positioned between the two films 104, 282 is placed between a first roller tool 294 and a second roller tool 296. First roller tool 294 has linear ridging 298. Then, the following are stacked sequentially and fed through roller tools 294, 296: film 104, deformable filler material 284, and film 282. The roller tools 294, 296 apply pressure which forces the film 104 against the tooled ridges 298 to deform the film 104 between the ridges 298 into the form of catenary-like cross-sectioned cylinders 280. Preferably, the roller tools 294, 296 are heated. When heated rollers 294, 296 are used, deformable material 284 may be more easily deformed if the deformable material 284 is selected to be thermally deformable. When the product is allowed to cool, the result is a fixed-shape hybrid screen 280. The use of heated rollers 294, 296 can also be used to activate and cure chemical processes in thermal-setting materials 284, which is a variant of the aforementioned simple elevated temperature thermal deformation process. The advantage of roll-forming is that a continuous process for forming an axial optical array allows for extremely long lengths of hybrid screen 280.

No matter what form of filler material is used, if the outer surface of the front film 104 should be smooth, then projected light will produce a bright line in the image as a result of reflection resulting from the index of refraction transition between the air and the film. This is a distractive feature that can be mitigated by providing a non-smooth surface morphology to dissipate the line into a larger field of vision. However, this non-smooth surface preferably will not have roughness features that are so small as to cause scattering effects that negate the refractive desires for the underlying cylindrical lenses. An example surface would have random orientation of "mounds" that are a tenth of a hybrid screen pixel in width and a tenth of that in height, with slopes having moderate pitch. With such surfaces, however, overhead lighting can find surface angles conducive to entry into the filler material. This is because the advantages of reflection away as a result of index of refraction differences relative to entry angle are not optimal for light rejection. When the overhead environmental light strikes the lens surface at an oblique angle, much of the light will be reflected at the front surface and not enter the screen. Accordingly, there is an advantage to maintaining oblique angles to the overhead lighting while at the same time dispersing the bothersome retro-reflective line produced by the projection light.

Figure 16A:
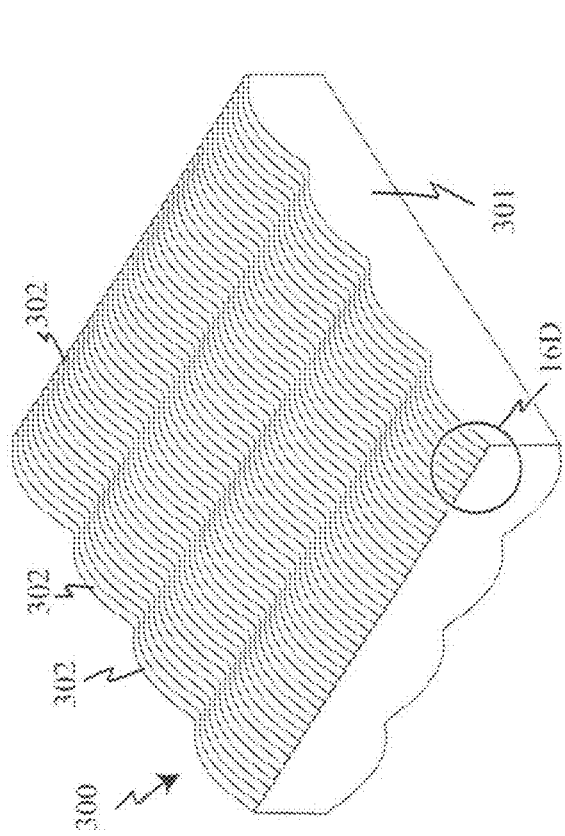
FIG. 16A is a perspective view of a projection-receiving surface according to another embodiment of the present invention having striations.
Figure 16B:
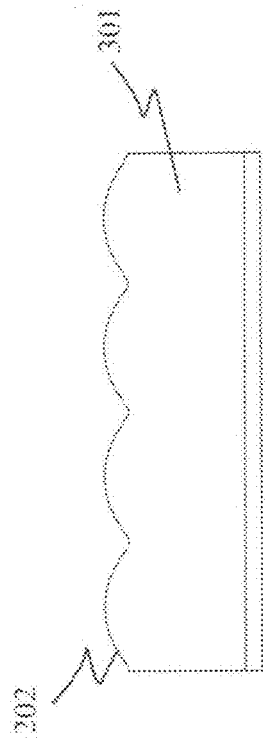
FIG. 16B is a front view of the projection-receiving surface of FIG. 16A.
Figure 16D:
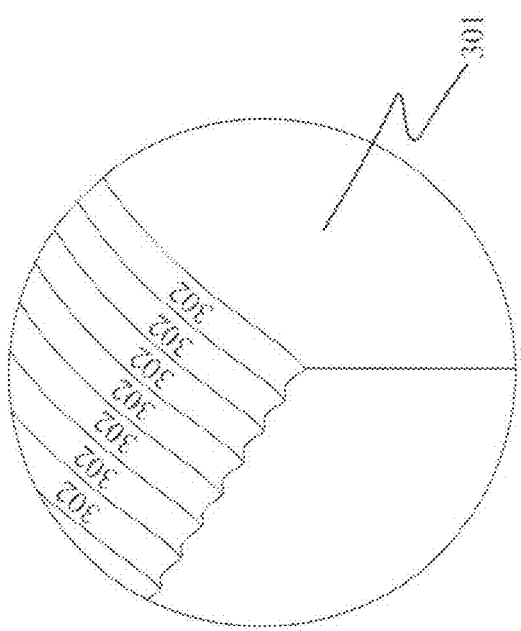
FIG. 16D is an enlarged view of the projection-receiving surface taken of circle 16D of FIG. 16A.
Figure 16C:
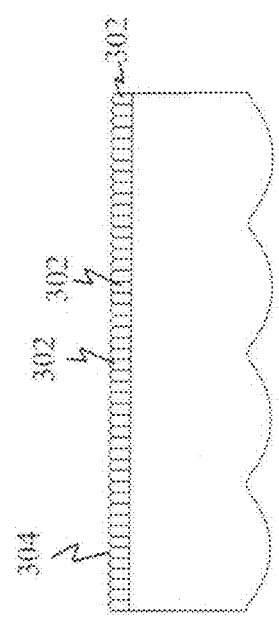
FIG. 16C is a side view of the projection-receiving surface of FIG. 16A.

This can be achieved by providing, as seen in FIGS. 16A, 16B, 16C, 16D, and 17A, a front surface shown generally at 300 on the screen 301 that has striations 302 oriented crosswise to the lens orientation. The profiles 304 of these striations 302 can vary in cross-sectional morphology from smooth undulations to multi-facets, to combinations of the two. For purposes of illustration, a preferred convex surface 304 is shown in FIG. 16C. A concave surface striation profile may also be provided and could provide good optical results, but such a surface profile leaves it more vulnerable to abrasion than with a convex surface. For any striation 302, the height of the striation must be at least 0.1 of the width of the striation 302.

As an example of possibilities with the attenuation and striation combination to improve the contrast ratio by a factor of two for a hybrid screen 280 with thickness of approximately 1 mm and pixel cell size of 1 mm by 1 mm, the following parameters might be used:

1) Increase the absorption coefficient of the filler medium to greater than 0.19/mm.

2) Provide a vertical striation scattering profile to the front surface of the screen rather than an "isotropic" scattering profile, wherein the frequency of the striations is at least 5 striations per cell.

3) Take advantage of the critical angle for the refractive index of the filler (approximately 1.5) to hold within it the vertically off-axis light so that it travels further in the medium via total internal reflection (TIR). An averaged length-entrapment value of at least 5.5 is likely. This means that any vertically off-axis light above about 60 degrees that enters the medium of the screen face will travel an average of at least 5.5 times further than the projection light, thereby being attenuated by a factor of at least 2.3 times more than the projected light attenuation if an absorption coefficient in the filler is brought to about 0.2/mm.

Figure 17A:
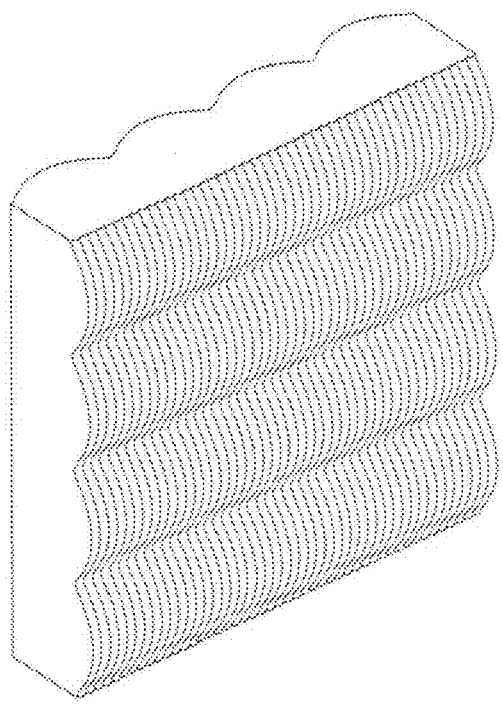
FIG. 17A is a perspective rear view of the projection-receiving surface of FIG. 16A.
Figure 17B:
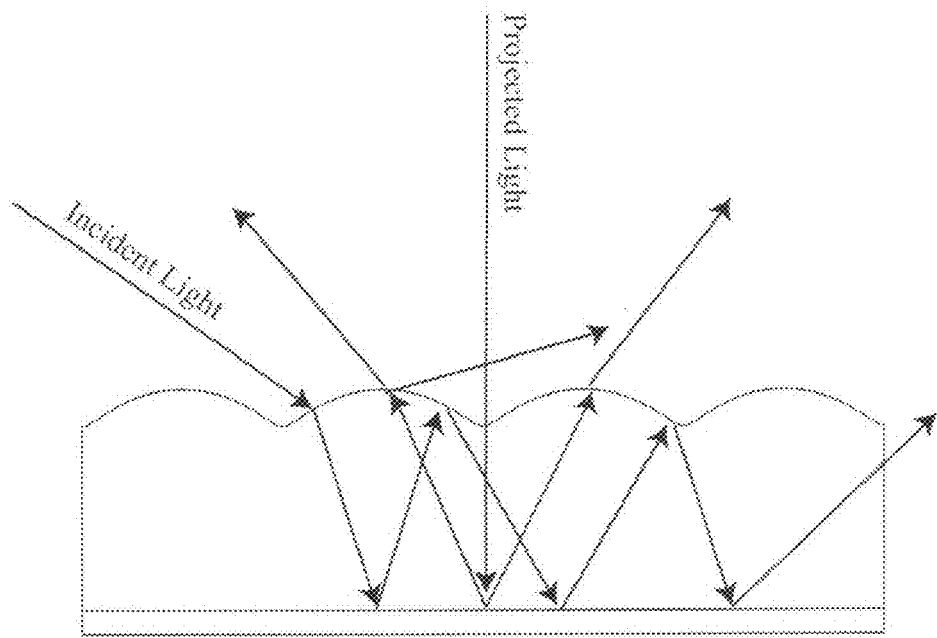
FIG. 17B is a rotated section rear view of FIG. 17A, showing various light paths.

The means by which this is achieved can be understood by review of the overall concept and in reference to FIG. 17B.

For enhancing the contrast ratio, we want to minimize overhead light entering the attenuating screen medium. For that Incident Light that does enter the screen medium seen in FIG. 17B, it is advantageous to entrap that light so that its path in the attenuating screen medium is long, thereby allowing the medium to attenuate it before it exits the screen.

Use of a random surface diffusion morphology such as nanoflaked reflector leaves means that the entry angle of overhead light above 60 degrees can still enter the screen and not take advantage of the Fresnel reflection coefficient to reject it. Furthermore, when the light has entered the screen, it is less likely to become entrapped via total internal reflection (TIR) because it will hit the front surface at angles above the total internal reflectance angle.

The part of the reflector cylinder where the angle is less than 2.5 deg will not contribute to the azimuth enough for the reflection to meet the TIR condition. However, the region where the angle is greater than 2.5 deg will cause a reflection that meets the TIR condition. This will continue with multi-bounce on the reflector until the angle condition is undone.

Figure 18:
FIG. 18 shows a shift of angle obtained as needed using a nature of a screen's reflecting cylinder.

Note that the azimuthally off-axis component of the incident light from above 60 degrees already has some likelihood of producing a TIR condition by itself unless it is undone by the reflection. FIG. 18 shows because of the nature of the screen's reflecting cylinders, a shift of angle that boosts up the angle as needed, with ratio of angles (15−2.5)/2.5=5, which means that 80% of the reflective surface area will add enough angle to bring about reflection of the overhead background light back into the medium. It should be noted that there is already considerable entrapment of the background light even before the TIR angle is met.

Using the refraction equation, we see that at incidence angle i=60, the refraction angle r=35.5. This is less than what is needed for total internal reflection (42 degrees) with the typical film and filler materials. However, the reflection off of the back of the hybrid screens vertical cylinders adds a few degrees to the angle, thereby setting up total internal reflection.

Figure 19:
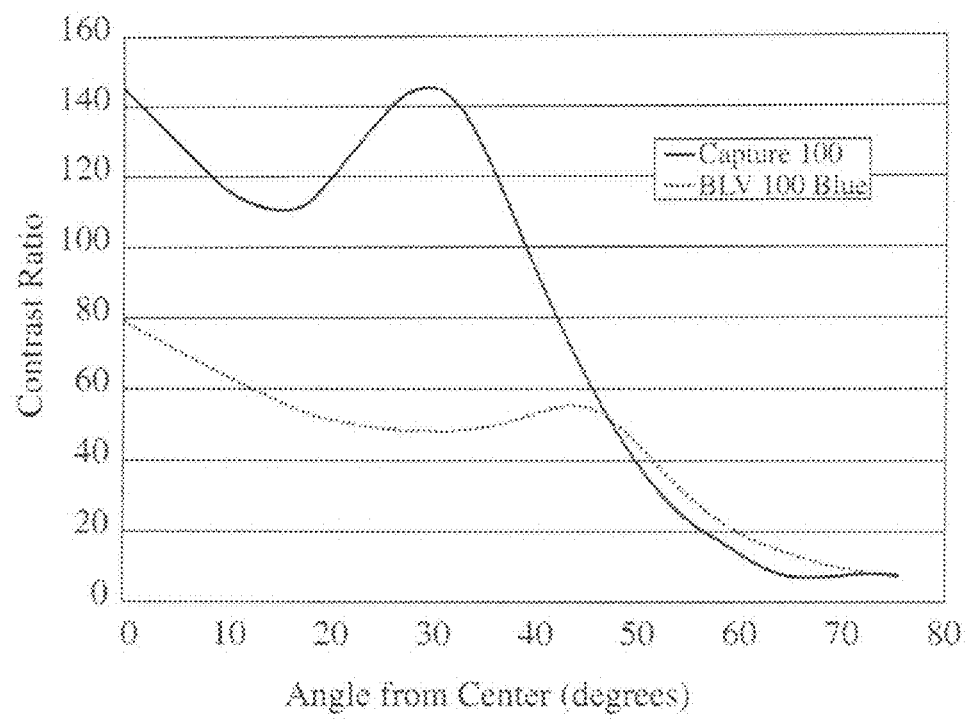
FIG. 19 shows enhancement of contrast ratio with absorption dye.

Off axis background light above 60 degrees actually hits the striated surface at an angle greater than 60 degrees because of the azimuth contribution associated with the vertical striation curvature. FIG. 19 shows a considerable enhancement of contrast rate where optional absorption dye (slightly blue-tinted dye) is used in the filler by comparing the contrast rate of a screen without dye with the contrast rate of a screen with dye.

Figure 20:
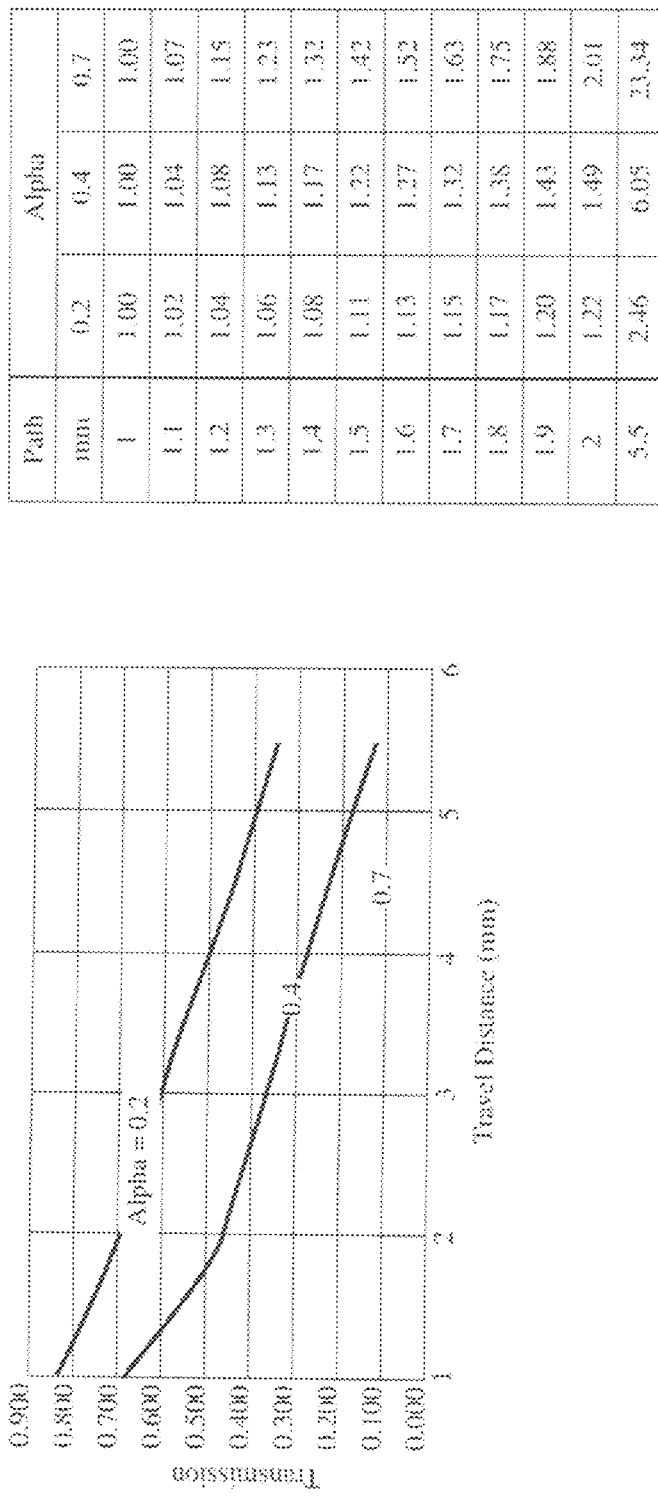
FIG. 20 shows a graph and table that indicate the effects of changing the absorption coefficient by changing the dye concentration.

FIG. 20 shows a graph and table that indicate the effects of changing the absorption coefficient by changing the dye concentration. The values in the table are normalized to compare with a 1 mm path that would represent the heads-on striking of projection light.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A projection-receiving surface comprising:
   a refraction surface having an undulating contour, said undulating contour of said first surface comprising a plurality of alternating convex cylindrical surface segments and concave cylindrical surface segments, said convex cylindrical surface segments and concave cylindrical surface segments of said undulating contour of said first surface arranged with cylindrical axes in a first direction; and
   a reflection surface having an undulating contour, said undulating contour of said second surface comprising a plurality of alternating convex cylindrical surface segments and concave cylindrical surface segments, said convex cylindrical surface segments and concave cylindrical surface segments of said undulating contour of said second surface arranged with cylindrical axes in a second direction;
   wherein said first direction and second direction are skew with each other; and
   wherein said undulating contour of said refraction surface approximately follows a curve defined by application of an equation of $y=\sqrt{[(qn-1)P/\tan\phi]^2-(x-1)^2]}-\{P/2\tan(\phi)\}$, where n is an index of refraction, q is a surface interaction coefficient, P is a dimension across a pixel, ($\phi$) is one half of a full field angle, x and y are coordinates defining the curve, 1 is an offset parameter =mP/2, with m=1,3,5, ... M.

2. The projection-receiving surface of claim 1 wherein said undulating contour of said reflection surface approximately follows a curve defined by application of an equation of $y=\sqrt{[P/2\sin\theta)^2-(x-k)^2]}-[P/2\tan(\theta)]$, wherein P is a dimension across a pixel, $\theta$ is one quarter of a full field angle, x and y are coordinates defining the curve, k is an offset parameter mP/2, with m=1,3,5, ... M.

3. The projection-receiving surface of claim 1 wherein said first direction is horizontal and said second direction is vertical.

4. The projection-receiving surface of claim 1 wherein said reflection surface is coated with a reflective film.

5. The projection-receiving surface of claim 1 wherein said refraction surface is covered by a transparent protection film.

6. The projection-receiving surface of claim 1 further comprising an optical sheet made of transparent material, wherein said optical sheet has said refraction surface on one side and said reflection surface on the other side.

7. The projection-receiving surface of claim 1 further comprising a first optical sheet and a second optical sheet, wherein said first optical sheet has said refraction surface and said second optical sheet has said reflection surface.

8. The projection-receiving surface of claim 7 wherein said first optical sheet and said second optical sheet are bonded to each other.

9. The projection-receiving surface of claim 7 wherein said first optical sheet and said second optical sheet are distanced from each other.

10. The projection-receiving surface of claim 1 wherein said reflection surface further has an additional surface feature selected from a group comprising striations, convex/concave cusps, and/or nanoflaked reflector leaves.

11. The projection-receiving surface of claim 10 wherein said additional surface feature is at least partially non-curved.

12. The projection-receiving surface of claim 1 wherein said reflection surface further has striations comprising a plurality of alternating convex segments and concave segments formed in an undulating manner arranged in said first direction.

13. The projection-receiving surface of claim 12 wherein the spatial frequency of said striations is higher than the spatial frequency of said undulating contour of said reflection surface.

14. The projection-receiving surface of claim 12 wherein said striations have about ten times the spatial frequency of said undulating contour of said reflection surface.

15. The projection-receiving surface of claim 12 wherein the undulating amplitude of said striations is smaller than the undulating amplitude of said undulating contour of said reflection surface.

16. The projection-receiving surface of claim 12 wherein said striations have from one-thirtieth to one-twentieth the amplitude of said undulating contour of said reflection surface.

17. The projection-receiving surface of claim 12 wherein said reflection surface further has striations comprising a plurality of alternating convex segments and concave segments formed in an undulating manner arranged in said first direction, and wherein said striations approximately follows a curve defined by application of the same equation with a spatial frequency higher than the spatial frequency of said undulating contour of said reflection surface.

18. The projection-receiving surface of claim 1 wherein said refraction surface further has additional surface feature.

19. The projection-receiving surface of claim 6 wherein said undulating contours of said refraction surface and reflection surface are formed by a process selected from the group comprising machining, milling, pressing, stamping, etching, vacuum forming, electroforming, rolling, molding, injection, casting, deposition, precipitation, photo-processes, broaching, film-suspension, and photo-processes.

20. The projection-receiving surface of claim 7 wherein said refraction surface of said first optical sheet and said reflection surface of said second optical sheet are formed by a process selected from the group comprising machining, milling, pressing, stamping, etching, vacuum forming, electroforming, rolling, molding, injection, casting, deposition, precipitation, photo-processes, broaching, photo-processes, film-suspension, and extruding.

21. The projection-receiving surface of claim 6 wherein said optical sheet further contains absorption dye.

22. A projection-receiving surface comprising:
a reflection surface having an undulating contour; said undulating contour comprising a plurality of alternating convex cylindrical surface segments and concave cylindrical surface segments, said convex cylindrical surface segments and concave cylindrical surface segments of said undulating contour of said reflection surface arranged with cylindrical axes in a first direction;
wherein said reflection surface further has an additional surface feature selected from a group comprising striations, cusps, and nanoflaked reflector leaves; and
wherein said undulating contour of said reflection surface approximately follows a curve defined by application of an equation of $y=\sqrt{[P/2\sin\theta)^2-(x-k)^2]}-[P/2\tan(\theta)]$, where P is a dimension across a pixel, $\theta$ is one quarter of a full field angle, x and y are coordinates defining the curve, k is an offset parameter mP/2, with m=1,3,5, . . . M.

23. The projection-receiving surface of claim 22, wherein said striations comprise a plurality of alternating convex segments and concave segments formed in an undulating manner arranged in a second direction skew with said first direction.

24. A projection-receiving surface comprising:
a refraction surface; and
a reflection surface,
wherein said first surface and second surface form a plurality of pixels;
wherein said plurality of pixels comprise convex-convex pixels, convex-concave pixels, concave-convex pixels, and concave-concave pixels, each of said convex-convex pixels formed by a convex refraction surface and a concave reflection surface, each of said convex-concave pixels formed by a convex refraction surface and a concave reflection surface, each of said concave-convex pixels formed by a concave refraction surface and a convex reflection surface, each of said concave-concave surface formed by a concave refraction surface and a concave reflection surface; and
wherein said undulating contour of said refraction surface approximately follows a curve defined by application of an equation of $y=\sqrt{[(qn-1)P/\tan\phi]^2-(x-1)^2]}-\{P/2\tan(\phi))\}$, where n is an index of refraction, q is a surface interaction coefficient, P is a dimension across a pixel, $\phi$ is one half of a full field angle, x and y are coordinates defining the curve, 1 is an offset parameter=mP/2, with m=1,3,5, . . . M.

25. A projection-receiving surface comprising:
a refraction surface having an undulating contour, said undulating contour of said first surface comprising a plurality of alternating convex cylindrical surface segments and concave cylindrical surface segments, said convex cylindrical surface segments and concave cylindrical surface segments of said undulating contour of said first surface arranged with cylindrical axes in a first direction; and
a reflection surface having an undulating contour, said undulating contour of said second surface comprising a plurality of alternating convex cylindrical surface segments and concave cylindrical surface segments, said convex cylindrical surface segments and concave cylindrical surface segments of said undulating contour of said second surface arranged with cylindrical axes in a second direction;
wherein said first direction and second direction are skew with each other; and
wherein said undulating contour of said reflection surface approximately follows a curve defined by application of an equation of $y=\sqrt{[P/2\sin\theta)^2-(x-k)^2]}-[P/2\tan(\theta)]$, where P is a dimension across a pixel, $\theta$ is one quarter of a full field angle, x and y are coordinates defining the curve, k is an offset parameter mP/2, with m=1,3,5, . . . M.

26. A projection-receiving surface comprising:
a refraction surface having an undulating contour, said undulating contour of said first surface comprising a plurality of alternating convex cylindrical surface segments and concave cylindrical surface segments, said convex cylindrical surface segments and concave cylindrical surface segments of said undulating contour of said first surface arranged with cylindrical axes in a first direction; and
a reflection surface having an undulating contour, said undulating contour of said second surface comprising a plurality of alternating convex cylindrical surface segments and concave cylindrical surface segments, said convex cylindrical surface segments and concave cylindrical surface segments of said undulating contour of said second surface arranged with cylindrical axes in a second direction;
wherein said first direction and second direction are skew with each other;
wherein said reflection surface further has striations comprising a plurality of alternating convex segments and concave segments formed in an undulating manner arranged in said first direction; and
wherein said striations have from one-thirtieth to one-twentieth the amplitude of said undulating contour of said reflection surface.

* * * * *